United States Patent [19]

Kroner et al.

[11] Patent Number: 5,466,762
[45] Date of Patent: Nov. 14, 1995

[54] BLOCK COPOLYACETALS, PREPARATION THEREOF AND USE THEREOF IN DETERGENTS AND CLEANERS

[75] Inventors: Matthias Kroner, Eisenberg; Gunnar Schornick, Neuleiningen; Richard Baur, Mutterstadt; Volker Schwendemann, Neustadt; Heinrich Hartmann, Limburgerhof, all of Germany

[73] Assignee: BASF Aktiengesellschaft, Ludwigshafen, Germany

[21] Appl. No.: 397,051

[22] Filed: Mar. 13, 1995

[30] Foreign Application Priority Data

Nov. 5, 1992 [DE] Germany .................. 42 37 337.9

[51] Int. Cl.$^6$ .................................................. C08L 61/02
[52] U.S. Cl. .............. 525/472; 252/174.21; 252/174.22; 252/174.23
[58] Field of Search ............... 252/174.21, 174.22, 252/174.23; 525/472

[56] References Cited

U.S. PATENT DOCUMENTS 5,330,675  7/1994  Kroner et al. ............... 252/174.23

OTHER PUBLICATIONS

Journal of Polymer Science: Polymer Letters Edition, vol. 18, 293–297 (1980) "Preparation of Polyacetals by the Reaction of Divinyl Ethers and Polyols".

*Primary Examiner*—W. Robinson Clark
*Attorney, Agent, or Firm*—Oblon, Spivak, McClelland, Maier & Neustadt

[57] ABSTRACT

There are described block copolyacetals obtainable by cationically initiated polyaddition of (A) polyacetals containing acetaldehyde acetal units and having at least 2 OH groups in the molecule and (B) polyacetals containing acetaldehyde acetal units and having at least 2 vinyl ether groups in the molecule.

in a molar ratio of (A):(B) of from 2:1 to 1:2, processes for preparing the block copolyacetals by cationically initiated polyaddition of (A) and (B), and the use of the block polyacetals as additament to reduced-phosphate and phosphate-free detergents and cleaners and as low-foam surfactants in dishwashing compositions.

5 Claims, No Drawings

BLOCK COPOLYACETALS, PREPARATION THEREOF AND USE THEREOF IN DETERGENTS AND CLEANERS

The present invention relates to block copolyacetals, processes for preparing them, and their use in detergents and cleaners.

J. Polym. Sci.: Polymer Letters Edition 18 (1980), 293–297, discloses the preparation of polyacetals by acid catalyzed addition of polyols to divinyl ethers. For instance, the p-toluenesulfonic acid catalyzed polyaddition of trans-1,4-cyclohexanedimethanol to a butanediol divinyl ether gives a polyacetal having a molecular weight of 200,000. The polyacetals described are used in medicine for the controlled release of drugs.

The as yet unpublished German Patent Application P 4142130.2 discloses the use of polyacetals obtainable by cationically initiated polyaddition of divinyl ethers and dihydroxy compounds with or without monohydroxy compounds as additament to reduced-phosphate and phosphate-free detergents and cleaners. It also discloses polyacetals obtainable by cationically initiated polyaddition of divinyl ethers and dihydroxy compounds and subsequent addition of monohydroxy compounds to 5–95% of the vinyl ether groups in the polyacetal, so that the resulting polyacetals have vinyl ether groups.

It is an object of the present invention to provide novel compounds for use in detergents and cleaners.

We have found that this object is achieved by the polyacetals which are obtainable by cationically initiated polyaddition of (A) polyacetals containing acetaldehyde acetal units and having at least 2 OH groups in the molecule and (B) polyacetals containing acetaldehyde acetal units and having at least 2 vinyl ether groups in the molecule, in a molar ratio of the OH groups in the polyacetals (A) to the vinyl ether groups in the polyacetals (B) of from 2:1 to 1:2.

We have also found a process for preparing block copolyacetals, which comprises subjecting (A) polyacetals containing acetaldehyde acetal units and having at least 2 OH groups in the molecule and (B) polyacetals containing acetaldehyde acetal units and having at least 2 vinyl ether groups in the molecule to a cationically initiated polymerization in a molar ratio of the OH groups in the polyacetals (A) to the vinyl ether groups in the polyacetals (B) of from 2:1 to 1:2.

The block copolyacetals thus obtainable are used as additament to reduced-phosphate and phosphate-free detergents and cleaners and as low-foam surfactants in dishwashing compositions.

The group (A) polyacetals containing acetaldehyde acetal units and having at least 2 OH groups in the molecule are prepared for example by subjecting (a) divinyl ethers and (b) dihydroxy compounds to a cationically initiated polyaddition in a molar ratio of from 1:2 to 1:1.0001. Optionally, monohydroxycompounds can be added as a further group (c) in the course of this cationically initiated polyaddition.

Any divinyl ether can be used as a monomer of group (a), for example divinyl ether, furan, ethylene glycol divinyl ether, diethylene glycol divinyl ether, triethylene glycol divinyl ether, tetraethylene glycol divinyl ether, propylene glycol divinyl ether, 1,4-butanediol divinyl ether, 1,6-hexanediol divinyl ether, bis(hydroxymethyl)cyclohexanedimethanol divinyl ether, polytetrahydrofuran divinyl ethers having molecular weights of from 250 to 4,500, polyethylene glycol divinyl ethers having molecular weights for the polyethylene glycol of up to 20,000, polypropylene glycol divinyl ethers having molecular weights of up to 10,000, divinyl ethers of copolymers of ethylene oxide and propylene oxide having molecular weights of up to 10,000, and divinyl ethers of diols obtainable by water elimination from polyols, e.g. dianhydrosorbitol divinyl ether, dianhydromannitol divinyl ether or dianhydroerythritol divinyl ether. All the dihydroxy compounds of group (b) can be used in the form of their divinyl ethers as monomers of group (a).

The monomers of group (b) are dihydroxy compounds. In principle it is possible to use any compound that has 2 OH groups, for example alkylene glycols, such as ethylene glycol, diethylene glycol, triethylene glycol, tetraethylene glycol, polyethylene glycols having molecular weights up to 10,000, propylene glycol, dipropylene glycol, polypropylene glycols having molecular weights up to 10,000, copolymers of ethylene oxide and propylene oxide and optionally butylene oxide having molecular weights up to 10,000, polytetrahydrofuran having molecular weights up to 10,000, 1,2-butanediol, 1,3-butanediol, 1,4-butanediol, 1,2-pentanediol, neopentylglycol, 1,5-pentanediol, 1,2-hexanediol, 1,3-hexanediol, 1,4-hexanediol, 1,5-hexanediol, 1,6-hexanediol, 1,7-heptanediol, 1,8-octanediol, 2,5-dimethyl-2,5-hexanediol, 1,4-bis(hydroxymethyl)cyclohexane, pyrocatechol, resorcinol and hydroquinone. In addition to the alkylene glycols and phenols it is also possible to use those dihydroxy compounds as monomer of group (b) which additionally carry further functional groups, for example ester, amide, nitrile, ether, acetal, imidoester, ketone, imide and thioether groups and also carbon-carbon double or triple bonds. Examples of suitable compounds of this kind are dimethyl tartrate, diethyl tartrate, methyl 2,2-bis(hydroxymethyl)propionate, neopentylglycol hydroxypivalate, 2-butene-1,4-diol and 3-hexyn-2,5-diol, bis(ethylene glycol) terephthalate, 1-phenylethylene glycol, and octadecanediol from hydrogenated castor oil. Examples of further suitable monomers of group (b) are dihydroxycarboxylic esters which are isolable or enzymatically, bacterially or chemically preparable from natural oils and fats, for example from rape seed oil, linseed oil or castor oil. Examples of such compounds are dihydroxy fatty acids such as 10,12-dihydroxystearic acid, 9,10-dihydroxystearic acid, 9,12-dihydroxy-10-octadecenoic acid, 9,12-dihydroxy-9-oxo-10-octadecenoic acid, 10,13-dihydroxy-11-octadecenoic acid and 12,13-dihydroxy-9-oxo-10-octadecenoic acid. Dihydroxy fatty esters are also obtainable by hydroxylation and oxidation of fatty acids of natural origin, for example from ricinoleic acid, linoleic acid, oleic acid, linolenic acid, elaidic acid, palmitoleic acid, myristoleic acid, palmitic acid and stearic acid. Diols formed from polyols by water elimination, for example dianhydrosorbitol, dianhydromannitol and dianhydroerythritol, are likewise suitable. The preferred monomers of group (b) are butanediol, hexanediol, diethylene glycol, polyethylene glycols having molecular weights of up to 20,000, triethylene glycol, dimethyl tartrate and diethyl tartrate.

Suitable monohydroxycompounds of group (c), the presence of which in the cationically initiated polyaddition is optional, include aliphatic and aromatic compounds which each have a hydroxyl group. The usually suitable hydroxyl-containing aliphatic and aromatic compounds contain up to 30 carbon atoms in the molecule. These compounds are primarily alcohols and phenols. However, they may additionally contain further functional groups, for example ester, amide, nitrile, ether, acetal, aminoester, imide and thioether groups and also carboncarbon double or triple bonds.

Examples of suitable compounds are monohydric $C_1$-$C_{30}$-alcohols, such as methanol, ethanol, n-propanol, isopropanol, n-butanol, isobutanol, tert-butanol, pentanols, 2-methylbutanol, 3-methylbutanol, tert-amyl alcohol, 3-methyl-3-pentanol, cyclohexanol, n-hexanol, n-octanol, isooctanol, decanol, dodecanol, stearyl alcohol and palmityl alcohol, and also oxo alcohols, which are obtainable by the oxo process by addition of carbon monoxide and hydrogen to olefins, allyl alcohol, phenol, o-, m- and p-cresol, alkylphenols, benzyl alcohol, propargyl alcohol, butynol, 3-methyl-3-buten-1-ol, 3-methyl-2-buten-1-ol, 2-methyl-3-buten-2-ol, 2-methyl-2-butyn-2-ol and 1-ethynylcyclohexanol.

Suitable monomers of group (c) also include reaction products of alcohols and phenols with from 1 to 100 mol of alkylene oxides. Suitable alkylene oxides are for example ethylene oxide, propylene oxide and butylene oxides. Suitable alkoxylation products are for example ethylene glycol monomethyl ether, ethylene glycol monoethyl ether, ethylene glycol monobutyl ether, propylene glycol monobutyl ether, 1,2-butylene glycol monomethyl ether, 2-(4-methoxyphenyl)ethanol, diethylene glycol monomethyl ether, diethylene glycol monoethyl ether, diethylene glycol monobutyl ether, reaction products of 1 mol of methanol with 3,9 or 25 mol of ethylene oxide, reaction products of an oxo alcohol with from 3 to 25 mol of ethylene oxide. Further suitable monofunctional alcohols are for example ethylene chlorohydrin, propylene chlorohydrin, 6-chlorohexanol, 8-chlorooctanol, methyl glycolate, ethyl glycolate, methyl lactate, ethyl lactate, isopropyl lactate, n-butyl lactate, isobutyl lactate, methyl mandelate, ethyl mandelate, hydroxypropionitrile, methyl hydroxybutyrate, ethyl hydroxybutyrate, methyl hydroxyvalerate, ethyl hydroxyvalerate, isopropyl hydroxyvalerate, methyl hydroxyisovalerate, ethyl hydroxyisovalerate, methyl hydroxyisobutyrate, ethyl hydroxyisobutyrate, methyl hydroxypivalate, ethyl hydroxypivalate, ethyl benzilate, mandelonitrile, diethyl hydroxymalonate, diethyl hydroxymethylmaleate, diethyl hydroxymethylmalonate, diethyl malate, triethyl titrate, ethyl hydroxycrotonate, dimethyl malate, trimethyl citrate, tri-n-propyl titrate, methyl hydroxycrotonate, methyl 3-hydroxy-4-hexenoate, 2-hydroxy-3,3-dimethylbutyrolactone, hydroxyacetone, glycolaldehyde, vanillin, eugenol, salicylaldehyde and acetoin.

It is also possible to use hydroxy fatty esters preparable bacterially, enzymatically or by chemical hydroxylation of oils or fats of natural origin, for example on the basis of linoleic acid, linolenic acid, oleic acid, elaidic acid, ricinoleic acid, palmitic acid and stearic acid. Products obtained include for example methyl 10-hydroxy-12-octadecenoate, methyl 10-hydroxy-12,15-octadecadienoate, methyl 12-hydroxyoleate, methyl ricinoleate, methyl 10-hydroxyoctadecanoate, methyl 10-hydroxystearate, methyl hydroxypalmitate, methyl 10-hydroxyhexadecanoate, methyl 13-hydroxy-12,13-epoxy-10-octadecanoate, methyl 9-hydroxy-10-oxo-12-octadecenoate and methyl 13-hydroxypalmitate.

The monomers (a), (b) and optionally (c) are subjected to a cationic polymerization. The OH group of a monomer of group (b) adds to a vinyl ether group of the monomer of group (a) to form an acetaldehyde acetal of the structure

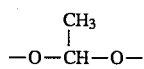

This polyaddition gives a polymeric backbone in which the monomer units are joined to one another via acetaldehyde acetal units. The cationic copolymerization of the monomers of groups (a), (b) and optionally (c) can be initiated by means of any acidic organic or inorganic substance. Suitable cationic initiators are for example oxalic acid, tartaric acid, adipic acid, succinic acid, succinic anhydride, citric acid, formic acid, acetic acid, propionic acid, malic acid, mono- or polyhalogenated carboxylic acids, such as trifluoroacetic acid or trichloroacetic, hydrogen chloride, hydrogen bromide, hydrogen iodide, sulfuric acid, phosphoric acid, benzenesulfonic acid, p-toluenesulfonic acid, boric acid, ascorbic acid, acidic aluminum oxide, aluminum sulfate, potassium aluminum sulfate, iron(II) sulfate, iron(III) sulfate, aluminum oxide, titanyl sulfate, iron(III) chloride, boron trifluoride, boron trichloride, boron tribromide, iodine, ion exchangers in the acid form and acid-loaded inert solids. The initiators for the cationic polymerization are customarily used in amounts of from 0.001 to 20, preferably from 0.01 to 1, % by weight, based on the monomers of groups (a) and (b). The copolymerization is highly exothermic. The reaction temperature is within the range from $-20°$ to 250° C., preferably from 0° to 200° C. depending on the activity of the initiator used.

The preferred polymerization initiators are oxalic acid, tartaric acid and citric acid.

For instance, in the presence of from 0.1 to 5% by weight of p-toluenesulfonic acid the monomers (a) and (b) react exothermically to completion within 10 min at as low as 40° C. If the copolymerization is initiated with 0.2% by weight of oxalic acid, it will take 1 hour at 90° C. or only 10 minutes at 130° C. However, it is also possible to make the oxalic acid-initiated copolymerization take place within a few seconds by carrying out at 200° C. In general, if the initiator used is a relatively weak acid (tartaric acid, oxalic acid or citric acid) the temperature employed is above 70° C., while if it is a strong acid, such as toluenesulfonic acid, the reaction temperature is maintained below 70° C. The copolymers formed are usually colorless oils or resins which, if oxalic acid or tartaric acid is used as the catalyst, are also thermally very stable.

The cationic polymerization of the monomers (a), (b) and optionally (c) is preferably carried out in the absence of a solvent. However, it is also possible to carry it out in the presence of inert diluents. This can be an advantage in certain cases, since the heat of reaction can then be readily removed using a vaporizing diluent. If a strong acid is employed as initiator, it is preferable to employ a solution of the initiator in a diluent, for example a from 0.005 to 10% strength by weight, particularly preferably a from 0.01 to 5% strength by weight, solution of p-toluenesulfonic acid in toluene.

Suitable for use as a diluent in the cationic copolymerization is any diluent without functional groups capable of reaction with vinyl ethers. Preference is given to using those diluents which are readily obtainable in anhydrous form and are not hygroscopic. Examples of suitable diluents are ethyl acetate, diethylene glycol diethyl ether, ethoxyethyl acetate, butoxyethyl acetate, aliphatic hydrocarbons, such as pentane, hexane, cyclohexane, n-heptane, n-octane and isooctane, and also aromatic hydrocarbons, such as toluene, xylene, mesitylene, tetralin and anisole. Suitable solvents also include tetrahydrofuran, dioxane and decalin, acetone, ethyl methyl ketone and cyclohexanone.

The copolymerization can be carried out for example as a one-pot reaction. To this end the monomers of groups (a) and (b) and optionally (c) can be mixed in a reaction vessel in the absence of atmospheric moisture, admixed with an initiator, and heated to the necessary reaction temperature. In a preferred embodiment, the total amount of initiator is introduced at 20° C. into the reaction vessel as the initial charge together with 10% of the monomer mixture of components (a), (b) and optionally (c) to be polymerized and the polymerization reaction is started, preferably under an inert gas atmosphere, by heating the initial charge. The mixture is stirred all the while and will be during the subsequent copolymerization as well. As soon as the polymerization has started, the rest of the monomer mixture of the compounds of components (a), (b) and (c) is added continuously or batchwise to the initial charge at such a rate that the heat of polymerization can be safely removed. If the initiator used is oxalic acid, tartaric acid or citric acid, initiation of the copolymerization of the monomers (a), (b) and optionally (c) requires temperatures of from about 70° to about 160° C. The acids then dissolve in the monomer mixture to form a homogeneous solution and the polymerization starts.

In the case of initiators which do not dissolve in the monomer mixture, the heterogeneous reaction mixture is heated to a temperature within the range from 100° to 250° C. until the polymerization starts.

After the copolymerization has ended, the initiator is either separated off or deactivated. Deactivation of the catalyst is advisable because in the presence of acidic substances and water or of other protic solvents the copolymers are prone to hydrolyze and lose molecular weight. To deactivate the initiator, the as-copolymerized and optionally cooled reaction mixture is mixed with an alkali, preferably sodium bicarbonate, sodium hydroxide, potassium hydroxide, sodium carbonate, potassium carbonate, ammonium carbonate, amines, such as ammonia, methylamine, dimethylamine, trimethylamine, ethylamine, diethylamine, dibutylamine, tributylamine, ethanolamine, diethanolamine, triethanolamine, morpholine or salts of strong bases and weak acids, such as sodium acetate, sodium formate or potassium bicarbonate. To deactivate the acidic initiators it is also possible to use calcium oxide, calcium hydroxide, basic aluminum oxide and basic ion exchangers. Insoluble initiators can be readily removed by filtration.

If the condensation of the above-specified compounds of the groups (a) and (b) is carried out in a molar ratio of from 1:2 to 1:1.0001, ie. with a molar excess of the compounds of component (b), polyacetals are formed which contain acetaldehyde acetal units and have at least 2 OH groups in the molecule. If, by contrast, the above-described compounds of components (a) and (b) are reacted in a molar ratio of from 2:1 to 1.0001:1, the polyacetals formed have at least 2 vinyl ether groups in the molecule as well as acetaldehyde acetal units. These polyacetals are the polyacetals of group (B). The polyacetals of the groups (A) and (B) preferably have K values of 10 to 100 (determined by the method of H. Fikentscher on a 1% strength solution in tetrahydrofuran at 25° C.).

The block copolyacetals of the invention are prepared by subjecting (A) polyacetals containing acetaldehyde acetal units and having at least 2 OH groups in the molecule and (B) polyacetals containing acetaldehyde acetal units and having at least 2 vinyl ether groups in the molecule to a cationically initiated polyaddition in a molar ratio of the OH groups in the polyacetals (A) to the vinyl ether groups in the polyacetals (B) of from 2:1 to 1:2.

This cationically initiated polyaddition requires the same initiators as described above for the polyaddition of the compounds (a) with the compounds (b). Similarly, the other measures described above for preparing the polyacetals containing acetaldehyde acetal units of the groups (A) and (B) are also customary for the reaction of the components (A) and (B); that is, the reaction is carried out at elevated temperatures and preferably in the absence of solvents.

The reaction of the polyacetals (A) with the polyacetals (B) can be diagrammatically exemplified as follows:

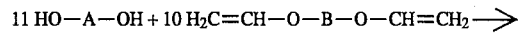

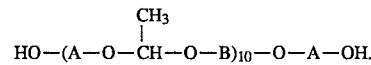

The ratio of the OH groups in the polyacetals (A) to the vinyl ether groups in the polyacetals (B) is from 2:1 to 1:2. The closer this ratio is to a numerical value of 1, the higher is the molecular weight of the resulting block copolyacetals. If the ratio is outside the specified range, then whichever is the excess component (A) or (B) will remain in the reaction mixture in virtually unchanged form. The degree of polymerization for the block copolymerization can be calculated for example by means of the following formula:

$$P_{block} = \frac{(A) + (B)}{(A) - (B)}$$

where (A) is the number of moles of polyacetal group A, (B) is the number of moles of polyacetal of group B, and $P_{block}$ is the degree of polymerization of the block copolymer and indicates how many blocks of A and B are present in the block copolymers.

The choice of polyacetals (A) and (B) makes it possible to form hydrophilic and hydrophobic blocks. More particularly, it is possible to prepare not only hydrophilic but also hydrophobic block copolyacetals each with terminal OH groups but also hydrophilic or hydrophobic block copolymers each having terminal vinyl ether groups. To illustrate this method of synthesis, block copolyacetals will now be described by way of example:

(1) A hydrophilic polyacetal of group (A) is prepared by subjecting 8 mol of triethylene glycol and 7 mol of triethylene glycol divinyl ether to a cationically initiated polyaddition. The polyacetal obtained is a polyacetal containing acetaldehyde acetal units and which on average numbers 15 monomer units and has an OH group at each end.

A hydrophobic polyacetal of group B can be prepared for example by subjecting 4 mol of 1,6-hexanediol and 5 mol of 1,4-butanediol divinyl ether to a cationically initiated copolymerization. The polyacetal obtained in this way is a polyacetal containing acetaldehyde acetal units of group (B) which on average numbers 9 monomer units and 2 vinyl ether end groups.

If the two above-described polyacetals (A) and (B) are reacted with one another by polyaddition, the product formed will be a block copolyacetal composed alternately of hydrophilic and hydrophobic blocks.

(2) A hydrophobic polyacetal (A) is prepared by subjecting to a cationically initiated polyaddition 11 mol of 1,4-butanediol and 10 mol of 1,4-butane diol vinyl ether. The polyacetal (A) obtained is hydrophobic and composed of 21 monomer units joined to each other via acetaldehyde acetal units and having OH end groups.

A hydrophilic polyacetal (B) is prepared by subjecting to a cationically initiated polyaddition 12 mol of a polyethylene glycol having an average molecular weight of 300 and 13 mol of triethylene glycol divinyl ether. The hydrophilic polyacetal (B) thus obtainable has on average 25 monomer units, joined to each other via acetaldehyde acetal units, and vinyl ether end groups. Polyaddition of the hydrophobic polyacetal (A) with the hydrophilic polyacetal (B) gives block copolyacetals which have surfactant properties.

(3) Reaction of 1 mol of 1,6-hexanediol divinyl ether with 2 mol of bis(hydroxymethyl)cyclohexane gives a hydrophobic polyacetal A having 3 monomer units joined together via acetaldehyde acetal units. The polyacetal has in total 2 OH end groups.

A hydrophilic polyacetal B is prepared by subjecting 19 mol of polyethylene glycol having an average molecular weight of 600 and 20 mol of tetraethylene glycol divinyl ether to a cationically initiated polyaddition. The hydrophilic polyacetal (B) obtained numbers on average 39 monomer units, joined together via acetaldehyde acetal units and terminated at each chain end by vinyl ether groups.

Polyaddition of the hydrophobic polyacetal (A) with the hydrophilic polyacetal (B) produces hydrophilic block copolyacetals containing small amounts of hydrophobic units. If of sufficiently high molecular weight, these block copolymers have thickener properties.

(4) Reacting 4 mol of hexanediol with 2 mol of bis(hydroxymethyl)cyclohexane divinyl ether gives 2 mol of a polyacetal A composed of 3 monomer units and having terminal OH groups.

Reacting 4 mol of triethylene glycol divinyl ether with 3 mol of triethylene glycol gives a hydrophilic polyacetal B which has 7 monomer units joined together via acetaldehyde acetal units. The hydrophilic polyacetal B has terminal vinyl ether groups.

Reacting the hydrophobic polyacetal A with the hydrophilic polyacetal B gives a block copolyacetal composed of 7 hydrophilic monomer units to which hydrophobic blocks of 3 monomer units each have been added at both ends. On average the block copolyacetal is composed of 13 monomer units with hydrophobic structures predominating at the ends and hydrophilic structures in the middle. This block copolyacetal has OH end groups.

By changing the starting quantities it is possible to control the properties of the block copolyacetals with respect to solvents, in particular with respect to water. In this way it is possible for example to produce the block structures described below:

I=hydrophilic block, can carry not only OH but also vinyl ether groups as end groups and O=hydrophobic block, can carry not only OH but also vinyl ether groups as end groups

I-O-I

O-I-O

I-O-I-O-I

O-I-O-I-O-I-O

I-O-I-O-I-O-I-O-I-O-I-O-I-O-I

It is also possible to react a hydrophilic block $I_1$ that has terminal OH groups at both ends with a hydrophilic block $I_2$ having terminal vinyl ether groups. This produces hydrophilic structures:

$I_2$-$I_1$-$I_2$ with vinyl ether groups at both ends. This hydrophilic block, which is composed of 2 different hydrophilic blocks, can add further hydrophilic macromers Is which have terminal OH groups:

$I_3$-$I_2$-$I_1$-$I_2$-$I_3$

The polyacetal composed of 3 different hydrophilic blocks ($I_1$, $I_2$, $I_3$) has terminal OH groups which can be reacted with hydrophobic blocks O having terminal vinyl ether groups:

O-$I_3$-$I_2$-$I_1$-$I_2$-$I_3$-O

The block copolyacetal has a hydrophilic core composed of 3 different blocks $I_3$, $I_2$, $I_3$ and hydrophobic ends O. Owing to the huge scope for variation, the possible combinations are virtually unlimited.

The properties of the block copolyacetals can be varied by the order in which the polyacetals (A) and (B) are reacted with one another. This may be exemplified by considering the reaction of a polyacetal (A) with a polyacetal (B) in such a ratio that the polyacetal (A) contains 2 mol of OH end groups and the polyacetal (B) 1 mol of vinyl ether end groups. If, for instance, (A) is added to (B), then the early part of the reaction, ie. as long as vinyl ether groups are still present, produces polymers of the form B-A-B with vinyl ether groups at both ends. As the addition of A continues, the proportion of polyacetal B in the reaction mixture decreases and the reaction of the divinyl ether blocks B-A-B with the polyacetal A increases, with the increasing formation of blocks of the form B-A-B-A-B-A-B. Once half the amount of polyacetal A has been metered in, the OH and vinyl ether groups are present in equimolar amounts and blocks of high molecular weight form. The 2nd half of the amount of A remains unused. The resulting reaction mixture thus contain blocks composed of the units $(A-B)_n$ and A.

If, however, the polyacetal B is added to the polyacetal A, OH groups will be present in excess, at least at the start of the addition of polyacetal B. Blocks of the form A-B-A will form with OH groups at both ends, and be present in the reaction mixture alongside unchanged polyacetal A. Only toward the end of the addition will the reaction mixture deplete in polyacetal A and the reaction of A-B-A blocks with polyacetal B increase markedly.

The order of combining the blocks is freely feasible. By varying the order of addition of the polyacetals A and B to the reaction mixture it is possible to control the properties of the resulting block polyacetals in a specific manner. In this way it is possible, for example, to produce polymer surfactants.

The block copolyacetals hydrolyze into acetaldehyde and diols at below pH7. If the block copolyacetals are dissolved in water which has been saturated with carbon dioxide, the block copolyacetals dissolved therein are cleaved virtually quantitatively within 4 weeks. At pH 2 the hydrolysis in an aqueous medium takes only a few minutes. The block copolymers can also be degraded by specific acid hydrolysis to create special properties. It is also possible, for example, to subject block copolyacetals which contain ester groups to an alkaline hydrolysis in an aqueous medium in order to convert the ester groups of the block copolyacetals into carboxylate salt groups. The block copolymers have for example K values within the range from 9 to 100 (determined by the method of H. Fikentscher on a one percent by weight polymer concentration in water at pH 8 and 25° C.). The molecular weight of the block copolymers (determined by viscometric measurements on aqueous solutions against polyethylene glycols as standards) is preferably from 300 to 150,000. The block copolymers and their hydrolysis products are readily biodegradable.

The block polyacetals are used as additament to pulverulent or liquid reduced-phosphate and phosphate-free detergents and cleaners. They are also useful as low-foam surfactants in dishwashing compositions. The amount of block copolyacetal used is customarily within the range 0.5–20, preferably from 2 to 10, % by weight in detergents and cleaners and within the range from 0.1 to 40% by weight in dishwashing compositions and mechanical cleaners.

For the purposes of the present invention reduced-phosphate detergents and cleaners contain less than 25% by weight of phosphate, calculated as pentasodium triphosphate. The compositions of pulverulent detergent formulations (washing powders) can vary widely. Phosphate-free detergent formulations, especially concentrated, pulverulent compact detergents, may in addition to containing the customary surfactant ingredients be built with a zeolite and/or sheet-silicates in the form of crystalline or amorphous pulverulent hydrated sodium silicates. Silicates of this kind are known; cf. EP-B-0164514 and EP-A-0444415. The same is true of the compositions of cleaner formulations. Detergent and cleaner formulations customarily contain surfactants in amounts of from 1 to 50% by weight, in some cases in even higher amounts, with or without a builder. These figures apply not only to liquid but also to pulverulent detergent and cleaner formulations. Examples of the compositions of detergent formulations which are customary in Europe, the US and Japan may be found for example in table form in Chemical and Engineering News 67 (1989), 35, and in Ullmanns Encyklopädie der technischen Chemie, Verlag Chemie, Weinheim 1983, 4th edition, pages 63–160. Further information concerning the compositions of detergents and cleaners can be found in WO-A-90/13581.

The block copolyacetals to be used according to the invention in detergents and cleaners improve the primary detergency of reduced-phosphate and phosphatefree detergents and cleaners, are easy to incorporate into these formulations, reduce the viscosity of water-containing surfactants, and produce stable, homogeneous detergent and cleaner formulations.

Owing to their viscosity-reducing effect, the block copolyacetals to be used according to the invention are important auxiliaries in the production of reduced-phosphate and phosphate-free detergents and cleaners. Owing to the use of these auxiliaries it is possible to raise the slurry concentration in the crutcher to at least 80%. This results in improved economics because of better utilization of the spray tower and in an energy saving because less water has to be evaporated. Similarly, the block copolyacetals and copolymers of the invention can be used with advantage wherever, in the course of the preparation of mixtures, a gel phase occurs which causes problems because of its high viscosity.

The block copolyacetals can also be used as emulsifiers and protective colloids for preparing dispersions. They are also useful as polymeric plasticizers in materials such as polyvinyl chloride or polystyrene. The block copolyacetals can also be used as flowable diol components for preparing polyurethanes. A preferred use of the block copolyacetals is as low-foam surfactants in dishwashing compositions and in bottle washing; that is, they are used not only in the cleaning of textiles but also in the cleaning of hard surfaces. The block copolymers are stable to alkaline ingredients of formulations and, owing to adhesive properties, they can also be used as water-soluble adhesives or raw materials for preparing water-soluble adhesives.

The percentages in the Examples are by weight, unless otherwise stated. The K values were determined by the method of H. Fikentscher, Cellulose-Chemie, 13 (1932), 58–64, 71–74, on a 1% strength by weight solution in water at pH 8 and 25° C.

The following abbreviations are used in the examples:

O denotes a hydrophobic block which can carry not only OH but also vinyl ether end groups.

I denotes a hydrophilic block of a polyacetal that contains acetaldehyde units, which can carry not only OH but also vinyl ether groups.

EXAMPLE 1

Block copolyacetal 1—preparation of a block copolyacetal of the type O-I-O with vinyl ether end groups The polyacetal A is a hydrophilic block I and is prepared by dissolving 0.4 g of oxalic acid in 0.7 mol (105 g) of triethylene glycol at 110° C. in a 500 ml capacity round-bottom flask and continuously adding over 2 hours 0.6 mol (94.8 g) of diethylene glycol vinyl ether. The reaction mixture is maintained at 110° C. for a further 30 minutes and then sampled to determine the residual vinyl ether group content by iodometry. It was found to be 0.003 mol of vinyl ether groups. The OH number of polyacetal A is 68 (calculated 56). The polyacetal is a flowable resin of K 15.1. Preparation of polyacetal B as a hydrophobic block O:

In a 500 ml capacity round-bottom flask 0.2 g of oxalic acid is dissolved in 0.6 mol (85.2 g) of 1,4-butanediol divinyl ether at 110° C. and admixed over 60 minutes with 0.4 mol (47.2 g) of 1,6-hexanediol. The reaction mixture is further stirred at 110° C. for 30 minutes. Then a sample is taken to determine the vinyl ether group content. It is found to be 0.38 mol of vinyl ether groups (calculated 0.4 mol).

To prepare a block copolyacetal according to the invention, the above-described block copolymer A is added in its as-prepared form to the polyacetal B over 2 hours and the mixture is reacted at 100° C. On completion of the addition of polyacetal A the reaction mixture is held at 110° C. for a further 40 minutes. The vinyl ether content determined on a sample by iodometry is 0.12 mol of vinyl ether groups. The block copolymer has a K value of 20.2.

EXAMPLE 2

Block copolyacetal 2

This block copolyacetal is a copolymer of the type $(O-I)_n$.

The polyacetal A forms the hydrophilic block I of the block copolyacetal. It is prepared by the method indicated in Example 1 for the preparation of the polyacetal A.

The polyacetal B is a hydrophobic block 0 which is obtained by dissolving 0.2 g of oxalic acid in 0.3 mol (42.6 g) of 1,4-butanediol divinyl ether at 110° C. in a 500 ml capacity round-bottom flask and the mixture is continuously admixed over 60 minutes with 0.2 mol (23.6 g) of 1,6-hexanediol. On completion of the addition of hexanediol the reaction mixture is further stirred at 10° C. for 30 minutes. Analysis of a sample indicates 0.11 mol of vinyl ether groups (calculated 0.10 mol).

To prepare block copolyacetals, the polyacetal A described in Example 1, which has a temperature of 110° C., is metered continuously over 2 hours to the above-described polyacetal B. On completion of the addition the reaction mixture is further heated at 110° C. for 40 minutes. Thereafter the vinyl ether group content is found to be 0.001 mol. The block copolymer formed has a K value of 25.7.

EXAMPLE 3

Block copolymer 3 of type O-I-O with OH end groups

A polyacetal A which is to form the hydrophobic block O of the block copolymer is prepared. For this purpose 0.3 g of oxalic acid is dissolved in 0.3 mol (43.2 g) of bis(hydroxymethyl)cyclohexane at 110° C. in a 250 ml capacity round-bottom flask and continuously admixed over 60 minutes with 0.2 mol (56 g) of 1,4-butanediol divinyl ether. The reaction mixture is then further heated at 110° C. for 30 minutes. It has a vinyl ether group content of 0.001 mol. The OH number is 65 (calculated 72) and the K value is 10.9.

The polyacetal B, which is to form the hydrophilic block I of the block copolymer, is prepared by dissolving, in a 250 ml capacity round-bottom flask, 0.5 g of oxalic acid in 0.55 mol (86.9 g) of diethylene glycol divinyl ether at 110° C. and continuously adding over 2 hours 0.5 mol (75 g) of triethylene glycol. On completion of the addition of the triethylene glycol the reaction mixture is further stirred at 110° C. for 30 minutes. Thereafter the iodometrically determined vinyl ether group content is found to be 0.08 mol (calculated 0.1 mol). Polyacetal B is a flowable resin. It has a K value of 11.3.

To prepare a block copolyacetal, the polyacetal B, which has a temperature of 110° C., is continuously metered over 2 hours to polyacetal A at 110° C. On completion of the addition of polyacetal B the reaction mixture is further stirred at 110° C. for 40 minutes. Thereafter the vinyl ether content of the block copolymer formed is determined by iodometry. It is found to be 0.003 mol of vinyl ether groups (calculation 0 mol). The OH number of the block copolymer is 32 (calculated 28) and the K value is 16.0.

EXAMPLE 4

Block copolymer 4

This block copolymer is of the type I-O-I-O-I and has OH end groups. The polyacetal A which is to form the hydrophilic block I of the block copolymer is prepared by dissolving 2 g of oxalic acid in 2.7 mol (405 g) of triethylene glycol at 110° C. in a 1000 ml capacity roundbottom flask and continuously adding over 3 hours 2.4 mol (380 g) of diethylene glycol vinyl ether. On completion of the addition of the divinyl ether the reaction mixture is further stirred at 110° C. for 30 minutes. The polyacetal A thus obtainable contains 0.005 mol of vinyl ether groups and has an OH number of 55 (calculated 43). The K value of the polyacetal A is 12.5.

The polyacetal B, which is to form the hydrophobic block O of the block copolyacetal, is prepared by dissolving 0.5 g of oxalic acid in 1.2 mol (170.4 g) of 1,4-butanediol divinyl ether at 110° C. in a 500 ml capacity round-bottom flask and adding over 60 minutes 1.0 mol (118 g) of 1,6-hexanediol. On completion of the addition of the hexanediol the reaction mixture is further heated at 110° C. for 30 minutes. Thereafter the vinyl ether group content is 0.37 mol (calculated 0.4 mol). The polyacetal B has a K value of 16.3.

To prepare a block copolyacetal of the above-indicated type, the polyacetal B, which has a temperature of 110° C., is continuously added to, and reacted with, the polyacetal heated to 110° C. On completion of the addition of the polyacetal B the reaction mixture is further stirred at 110° C. for 40 minutes. The oxalic acid used in preparing the polyacetals A and B is sufficient to catalyze the preparation of the block copolyacetals from the polyacetals A and B. The block copolyacetal thus obtainable has a vinyl ether group content of 0.002 mol and an OH number of 15 (calculated 10). The K value of the block copolyacetal is 23.0.

EXAMPLE 5

Block copolyacetal 5

This block copolyacetal is of the type O-I$^1$-I-I$^1$-O with OH groups.

Preparation of the polyacetal A which is to form block I of the block copolymer.

In a 500 ml capacity round-bottom flask, 0.4 g of oxalic acid is dissolved in 0.3 mol (90 g) of polyethylene glycol of molecular weight 300 at 110° C. and continuously admixed over 2 hours with 0.2 mol (31.6 g) of diethylene glycol divinyl ether. On completion of the addition of the divinyl ether the reaction mixture is further stirred at 110° C. for 30 minutes and sampled. Analysis of the sample indicates 0.18 mol of vinyl ether groups (calculated 0.2 mol) and an OH number of 112 (calculated 92). The K value of the polyacetal A is 9.1. Preparation of the polyacetal B which is to form the hydrophilic block I$^1$.

In a 500 ml capacity round-bottom flask, 0.4 g of oxalic acid is dissolved in 0.6 mol (130.8 g) of triethylene glycol divinyl ether and mixed over 60 minutes with 0.4 mol (82.4 g) of diethyl tartrate. On completion of the addition of the tartaric ester the reaction mixture is further stirred at 110° C. for 45 minutes and then has a sample taken from it for analysis. Iodometry reveals 0.37 mol of vinyl ether groups (calculated 0.4 mol). Polyacetal B has a K value of 10.3. Preparation of polyacetal A1 which is to form the hydrophobic block O of the block copolyacetal.

In a 500 ml capacity round-bottom flask, 0.4 g of oxalic acid is dissolved in 0.8 mol (114 g) of 1,4-butanediol divinyl ether at 110° C. and continuously mixed over 60 minutes with 1.0 mol (118 g) of hexanediol at that temperature. The reaction mixture is then further stirred at 110° C. for 30 minutes. A sample taken from the reaction mixture is analyzed iodometrically to determine the vinyl ether group content as 0.006 mol. The OH number is 96 (calculated 90). Polyacetal A1 has a K value of 13.5.

To prepare the block copolyacetal of the aboveindicated type, polyacetal A, which has a temperature of 110° C., is continuously metered over 2 hours into polyacetal B, which is likewise at a temperature of 110° C. The reaction is carried out at the stated temperature. The reaction mixture is stirred at 110°C. for 60 minutes. Thereafter the vinyl ether group content is found to be 0.18 mol (calculated 0.2 mol). The block copolyacetal thus obtained is then metered continuously over 2 hours to polyacetal A1, heated to a temperature of 110° C., and thereafter the reaction mixture is further heated at 110° C. for 30 minutes. Thereafter the vinyl ether content of the block copolyacetal is 0.008 mol and the OH number is 18 (calculated 19).

Subsequent alkaline treatment with 0.4 mol of sodium hydroxide solution of the block copolyacetal thus prepared hydrolyzes some of the ester groups incorporated with polyacetal B into the block copolyacetal and converts them into the sodium salt form. The K value of the polymer in the sodium form is 14.7. Application section The above-described block copolyacetals are tested for usefulness as additament to detergents and cleaners. The examples which follow demonstrate the effect of the block copolyacetals on the primary detergency and graying. To determine the graying tendency, standard soil cloths are washed repeatedly together with white test fabric, the soil cloth being renewed after every wash. The soil which detaches from the cloth and goes on to the white test fabric in the course of the wash brings about a drop in the whiteness, which is measured.

To determine the primary detergency and the graying, the following conditions are observed:

| Washing apparatus | Launder-o-meter |
| --- | --- |
| Washing temperature | 60° C. |
| Water hardness | 3 mmol Ca/l = 16.8° of German hardness ratio Ca:Mg 3:1 |
| Washing time | 30 min (including heating-up time) |
| Washing cycles | 4 |
| Detergent dose | 6 g/l |
| Liquor ratio | 14.3:1 |
| Fabrics | |
| White fabric: | cotton/polyester fabric polyester fabric |
| Soil fabric: | WFK 20 D (Wäschereiforschung Krefeld) (renewed after every wash) |
| Whiteness measurement with Elrepho 2000 from Datacolor in % reflectance | |
| Whiteness of unwashed fabrics: | |
| Cotton/polyester | 80.1 |
| Polyester | 78.0 |
| WFK 20 D | 38.0 |

What is reported is in each case the whiteness difference on the individual fabrics before and after the wash. The larger the whiteness difference on the soil cloth WFK 20 D, the higher the primary detergency. The smaller the differences on the white fabrics, the better the grayness inhibition.

The results were compared with those of a detergent formulation which contains no block copolyacetal. Formulation A:

| Formulation A: | |
| --- | --- |
| 10% | of sodium dodecyl benzenesulfonate, 50% strength in water |
| 3% | of the reaction product of 1 mol of $C_{13}/C_{15}$ oxo alcohol and 7 mol of ethylene oxide (surfactant A) |
| 2% | of polypropylene glycol of molecular weight 600 |
| 77% | of water |
| 8% | of block copolyacetal according to any one of Examples 1 to 5 |

The effects obtained in respect of graying and primary detergency on using the block copolyacetals to be used according to the invention are indicated in the table.

TABLE

| Example | Addition of block copolyacetal acccording to Example No. | Primary detergency WPK 20 D | Graying Polyester | Graying PES/cotton |
| --- | --- | --- | --- | --- |
| 6 | 1 | 22.6 | 7.9 | 13.0 |
| 7 | 2 | 22.6 | 7.0 | 11.6 |
| 8 | 3 | 23.0 | 7.5 | 11.3 |
| 9 | 4 | 22.0 | 8.1 | 12.2 |
| 10 | 5 | 23.5 | 8.6 | 11.8 |
| Comparative Example | none | 17.5 | 9.3 | 13.5 |

As can be seen from the table, the block copolyacetals of the invention improve the primary detergency of the formulation to a distinct degree. At the same time improved grayness inhibition is observed. It has to be taken into account here that, because the primary detergency is appreciably improved by the block copolyacetals to be used according to the invention, higher soil concentrations are present in the wash liquor and hence higher soil quantities are available for redeposition. All the polymers to be used according to the invention were incorporable into the detergent formulation without problems and led to homogenous, stable solutions.

We claim:

1. Block copolyacetals, obtained by cationically initiated polyaddition of
   (A) polyacetals containing acetaldehyde acetal units and having at least 2 OH groups in the molecule and
   (B) polyacetals containing acetaldehyde acetal units and having at least 2 vinyl ether groups in the molecule,
   in a molar ratio of the OH groups in the polyacetals (A) to the vinyl ether groups in the polyacetals (B) of from 2:1 to 1:2.

2. A process for preparing block copolyacetals, which comprises subjecting
   (A) polyacetals containing acetaldehyde acetal units and having at least 2 OH groups in the molecule and
   (B) polyacetals containing acetaldehyde acetal units and having at least 2 vinyl ether groups in the molecule to a cationically initiated polyaddition in a molar ratio of the OH groups in the polyacetals (A) to the vinyl ether groups in the polyacetals (B) of from 2:1 to 1:2.

3. A reduced-phosphate detergent composition comprising the block copolyacetals of claim 1 and a detergent.

4. A phosphate-free detergent composition comprising the block copolyacetals of claim 1 and a detergent.

5. A dishwashing composition, comprising the block copolyacetals of claim 1 and a surfactant.

* * * * *